US012590680B2

(12) United States Patent
Thomas

(10) Patent No.: US 12,590,680 B2
(45) Date of Patent: Mar. 31, 2026

(54) LIGHT

(71) Applicant: LED Lighting Concepts LLC, Knoxville, TN (US)

(72) Inventor: David Graham Thomas, Loudon, TN (US)

(73) Assignee: LED Lighting Concepts, LLC, Knoxville, TN (US)

( * ) Notice: Subject to any disclaimer, the term of this patent is extended or adjusted under 35 U.S.C. 154(b) by 112 days.

(21) Appl. No.: 18/652,998

(22) Filed: May 2, 2024

(65) Prior Publication Data

US 2024/0369194 A1 Nov. 7, 2024

Related U.S. Application Data

(60) Provisional application No. 63/500,422, filed on May 5, 2023.

(51) Int. Cl.
*F21K 9/238* (2016.01)
*F21V 23/00* (2015.01)
*F21Y 107/30* (2016.01)
*F21Y 113/13* (2016.01)
*F21Y 115/10* (2016.01)
*H05B 47/19* (2020.01)

(52) U.S. Cl.
CPC ............ *F21K 9/238* (2016.08); *F21V 23/008* (2013.01); *H05B 47/19* (2020.01); *F21Y 2107/30* (2016.08); *F21Y 2113/13* (2016.08); *F21Y 2115/10* (2016.08)

(58) Field of Classification Search
CPC ........ F21K 9/238; H05B 47/19; F21V 23/008
See application file for complete search history.

(56) References Cited

U.S. PATENT DOCUMENTS

| | | | | |
|---|---|---|---|---|
| 8,517,583 | B2 * | 8/2013 | Wesson | F21K 9/23 362/547 |
| 10,591,116 | B2 * | 3/2020 | Gao | F21V 3/061 |
| 10,598,315 | B2 * | 3/2020 | Wen | F21V 19/005 |
| 11,867,363 | B2 * | 1/2024 | Sokolov | F21V 29/83 |
| 2007/0159828 | A1 * | 7/2007 | Wang | F21K 9/232 362/294 |
| 2015/0092404 | A1 * | 4/2015 | Kim | F21V 29/506 362/227 |
| 2015/0098223 | A1 * | 4/2015 | Su | F21K 9/232 362/249.02 |
| 2016/0341370 | A1 * | 11/2016 | Dekker | F21K 9/237 |
| 2019/0013960 | A1 * | 1/2019 | Sadwick | H05B 47/196 |
| 2021/0369905 | A1 * | 12/2021 | Bosua | F21V 23/045 |

* cited by examiner

*Primary Examiner* — Bryon T Gyllstrom
(74) *Attorney, Agent, or Firm* — Robinson IP Law, PLLC

(57) ABSTRACT

Various implementations include a light including a central body and two or more lighting portions. The central body has a longitudinal axis, a first portion, and a second portion opposite and spaced apart along the longitudinal axis from the first portion. The two or more lighting portions each include two or more red-green-blue (RGB) light-emitting diodes (LEDs). The two or more LEDs of each of the two or more lighting portions are linearly spaced apart from each other such that each of the two or more lighting portions extend from the first portion to the second portion. The two or more lighting portions are circumferentially spaced apart from each other about the longitudinal axis.

26 Claims, 5 Drawing Sheets

LIGHT

BACKGROUND

Current lighting solutions for exterior lighting, such as pathway lighting, require extensive electronic communication to control the lights within individual lamps in a custom way. Some solutions include hardwiring signal wires or wireless internet connectivity. However, for existing lamps, extensive retrofitting work is necessary to implement these communication systems.

SUMMARY

Various implementations include a light including a central body and two or more lighting portions. The central body has a longitudinal axis, a first portion, and a second portion opposite and spaced apart along the longitudinal axis from the first portion. The two or more lighting portions each include two or more red-green-blue (RGB) light-emitting diodes (LEDs). The two or more LEDs of each of the two or more lighting portions are linearly spaced apart from each other such that each of the two or more lighting portions extend from the first portion to the second portion. The two or more lighting portions are circumferentially spaced apart from each other about the longitudinal axis.

In some implementations, the light further includes an E26/27 medium connector or an E39/40 mogul connector.

In some implementations, the two or more lighting portions are a total of 60 W.

In some implementations, the two or more RGB LEDs include two or more red-green-blue-white (RGBW) LEDs. In some implementations, the two or more RGB LEDs include two or more red-green-blue-amber (RGBA) LEDs.

In some implementations, the two or more lighting portions are capable of having an average light level in the range of 0.5 fc to 3.0 fc as measured in a horizontal plane. In some implementations, the average light level is 1.5 fc as measured in the horizontal plane.

In some implementations, the two or more lighting portions includes eight or more lighting portions. In some implementations, the two or more LEDs includes sixteen or more LEDs.

In some implementations, the two or more lighting portions are circumferentially spaced apart from each other equally about the longitudinal axis.

In some implementations, the light further includes a long-range Bluetooth mesh module. The long-range Bluetooth mesh module includes a controller for controlling parameters of the two or more LEDs, a Bluetooth receiver, and a Bluetooth amplifier. In some implementations, the Bluetooth amplifier is capable of transmitting a readable Bluetooth signal 30 m or more along an unobstructed line of sight. In some implementations, the Bluetooth receiver is capable of receiving and sending Bluetooth signals including information for up to two hundred and fifty lights. In some implementations, the long-range Bluetooth mesh module is a Bluetooth Low Energy device.

Various other implementations include a lighting system. The lighting system includes a first light and a second light. Each of the first light and second light includes a central body, two or more lighting portions, and a long-range Bluetooth mesh module. The central body has a longitudinal axis, a first portion, and a second portion opposite and spaced apart along the longitudinal axis from the first portion. The two or more lighting portions each include two or more LEDs. The two or more LEDs of each of the two or more lighting portions are linearly spaced apart from each other such that each of the two or more lighting portions extend from the first portion to the second portion. The two or more lighting portions are circumferentially spaced apart from each other about the longitudinal axis. The long-range Bluetooth mesh module has a controller for controlling parameters of the two or more LEDs, a Bluetooth receiver, and a Bluetooth amplifier. The long-range Bluetooth mesh module of the first light is capable of sending to the second light a signal including information for the parameters of the first light and the second light. The long-range Bluetooth mesh module of the second light is capable of receiving the signal and adjusting the parameters of the second light based on the information included in the signal.

In some implementations, the first light and the second light each further include an E26/27 medium connector or an E39/40 mogul connector.

In some implementations, the two or more lighting portions of each of the first light and the second light are a total of 60 W.

In some implementations, the two or more RGB LEDs of each of the first light and the second light comprise two or more red-green-blue-white (RGBW) LEDs. In some implementations, the two or more RGB LEDs of each of the first light and the second light comprise two or more red-green-blue-amber (RGBA) LEDs.

In some implementations, two or more lighting portions are capable of having an average light level in the range of 0.5 fc to 3.0 fc as measured in a horizontal plane. In some implementations, the average light level is 1.5 fc as measured in the horizontal plane.

In some implementations, the two or more lighting portions of each of the first light and the second light includes eight or more lighting portions. In some implementations, the two or more LEDs of each of the first light and the second light includes sixteen or more LEDs.

In some implementations, the two or more lighting portions of each of the first light and the second light are circumferentially spaced apart from each other equally about the longitudinal axis.

In some implementations, the Bluetooth amplifier of each of the first light and the second light is capable of transmitting a readable Bluetooth signal 30 m or more along an unobstructed line of sight. In some implementations, the Bluetooth receiver of each of the first light and the second light is capable of receiving and sending Bluetooth signals including information for up to two hundred and fifty lights. In some implementations, the long-range Bluetooth mesh module of the first light and the second light is a Bluetooth Low Energy device.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
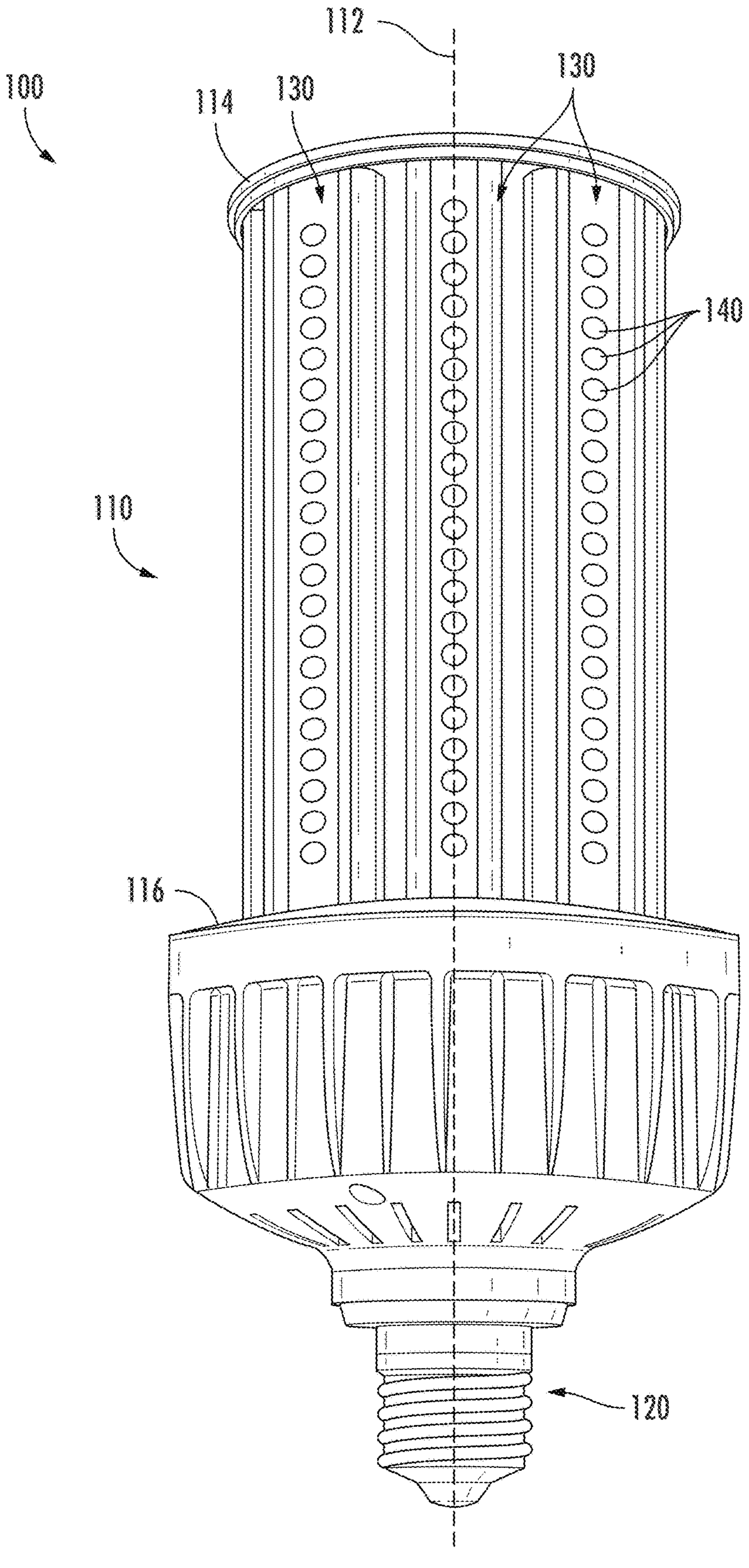
FIG. 1A is a bottom perspective view of a light, according to one implementation.

The devices, systems, and methods disclosed herein provide for a light for easily retrofitting an existing lamp with built-in control for multiple lights. The lights include a color mixing light engine that produces enough light in white to compare with existing lighting (induction and LED-white (average 1ftcd)) and offer color mixing, individual control, and expandable and reliable network. This will enable towns/cities/parks or anywhere which utilizes this style of light to be able to offer white, everyday use lighting and color mixing lighting to show social awareness for holidays. Colleges, Universities, and Schools can offer their colors to show solidarity and support for the local team on game day.

The lights disclosed herein can be made to retrofit existing lamp lighting and can have E26/27 medium connectors or E39/40 mogul connectors such that the light can be directly inserted into an existing light socket.

The lights can include a corn lamp style configuration including multiple axially extending strips of lighting that are circumferentially spaced around the longitudinal axis of the light, resembling the rows of kernels of corn on a cob. This lighting configuration can include multiple light-emitting diodes (LEDs) that surround the central body of the light to provide 360 degrees of even lighting. The lights disclosed herein can be capable of outputting enough light to be used as exterior pathway lighting, as defined in David L. DiLaura et. al., Illuminating Engineering Society, The Lighting Handbook, 10th Edition (2011).

The LEDs can be red-green-blue (RGB), red-green-blue-white (RGBW), or red-green-blue-amber (RGBA) to allow for white lighting and customizable colors. The lights can each include a long-range Bluetooth mesh module capable of relaying information from one light to another. In this way, all of the lights in an area can be controlled by beginning a control signal at a single light. Furthermore, if a light has failed, the signal may be able to pass through other lights within range to bypass the failed light.

Various implementations include a light including a central body and two or more lighting portions. The central body has a longitudinal axis, a first portion, and a second portion opposite and spaced apart along the longitudinal axis from the first portion. The two or more lighting portions each include two or more red-green-blue (RGB) light-emitting diodes (LEDs). The two or more LEDs of each of the two or more lighting portions are linearly spaced apart from each other such that each of the two or more lighting portions extend from the first portion to the second portion. The two or more lighting portions are circumferentially spaced apart from each other about the longitudinal axis.

Various other implementations include a lighting system. The lighting system includes a first light and a second light. Each of the first light and second light includes a central body, two or more lighting portions, and a long-range Bluetooth mesh module. The central body has a longitudinal axis, a first portion, and a second portion opposite and spaced apart along the longitudinal axis from the first portion. The two or more lighting portions each include two or more LEDs. The two or more LEDs of each of the two or more lighting portions are linearly spaced apart from each other such that each of the two or more lighting portions extend from the first portion to the second portion. The two or more lighting portions are circumferentially spaced apart from each other about the longitudinal axis. The long-range Bluetooth mesh module has a controller for controlling parameters of the two or more LEDs, a Bluetooth receiver, and a Bluetooth amplifier. The long-range Bluetooth mesh module of the first light is capable of sending to the second light a signal including information for the parameters of the first light and the second light. The long-range Bluetooth mesh module of the second light is capable of receiving the signal and adjusting the parameters of the second light based on the information included in the signal.

Figure 1B:
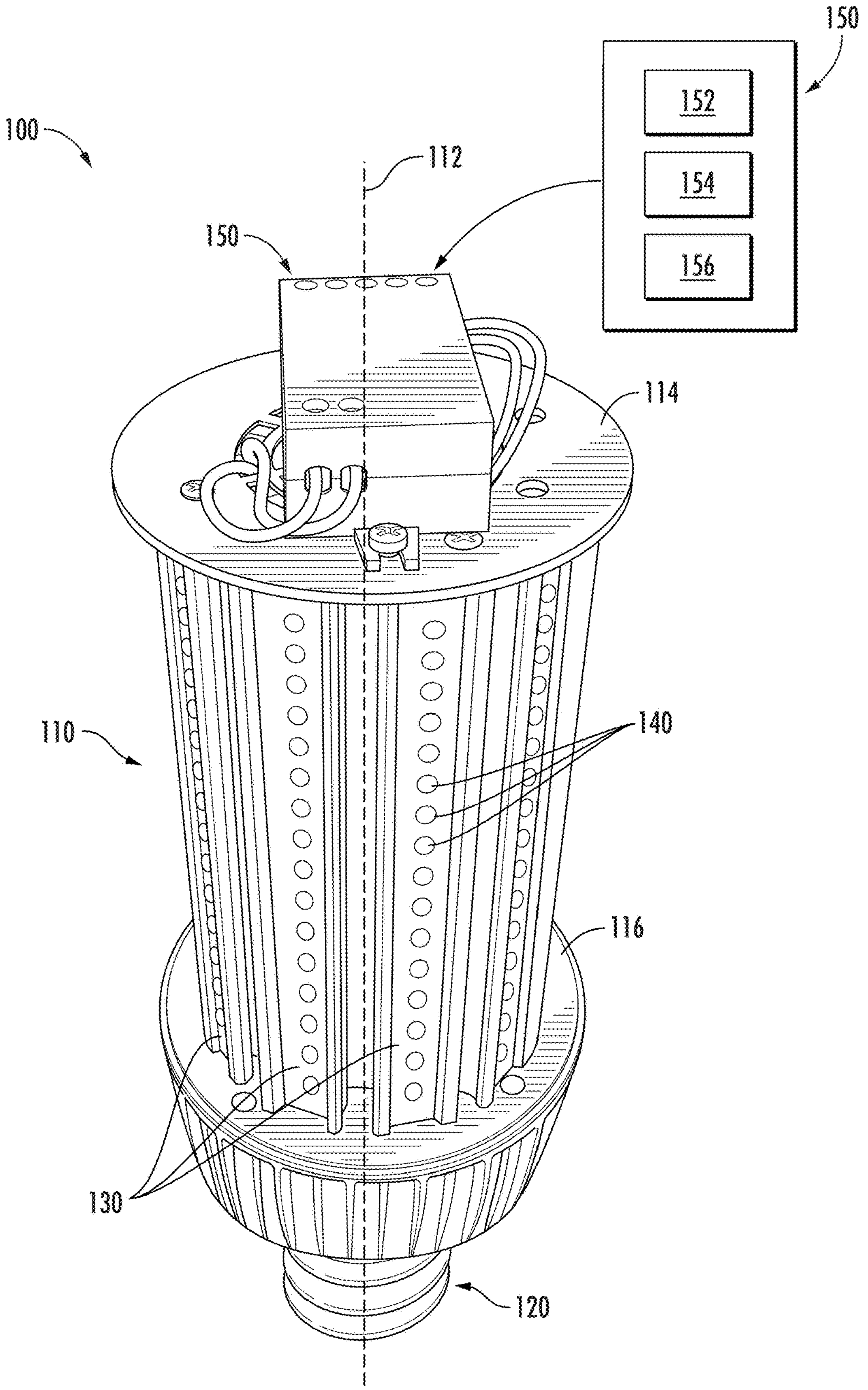
FIG. 1B is a top perspective view of the light of FIG. 1A.
Figure 1C:
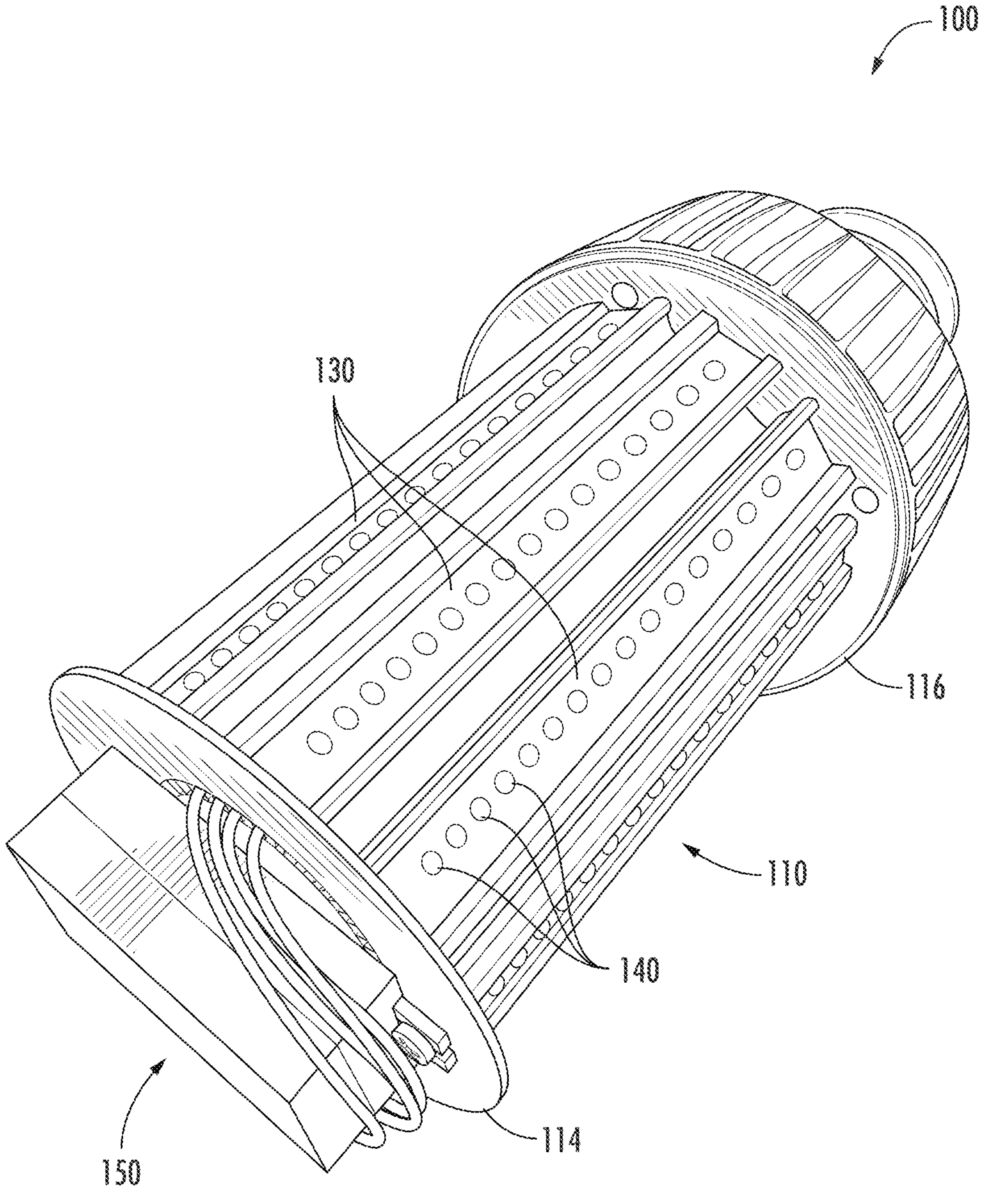
FIG. 1C is a side perspective view of the light of FIG. 1A.
Figure 2A:
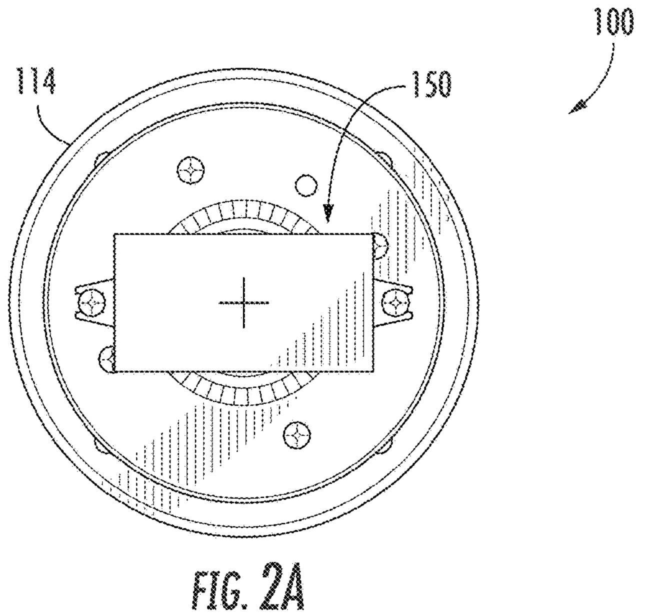
FIG. 2A is a top view of the light of FIG. 1A.
Figure 2B:
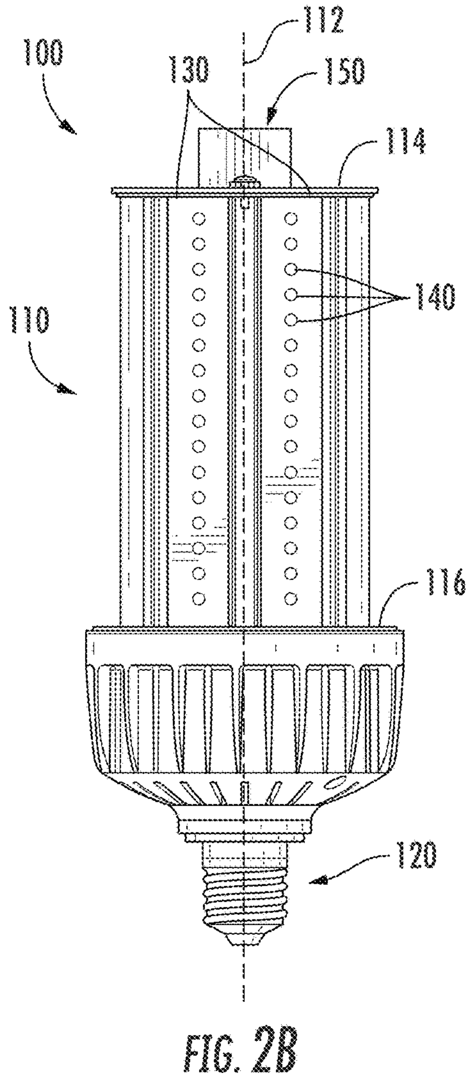
FIG. 2B is a front view of the light of FIG. 1A.
Figure 2C:
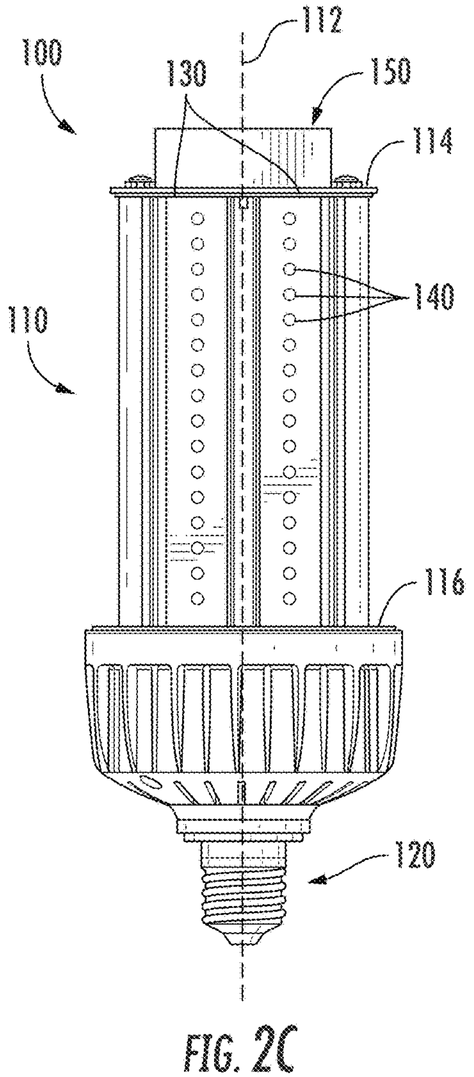
FIG. 2C is a right view of the light of FIG. 1A.
Figure 2D:
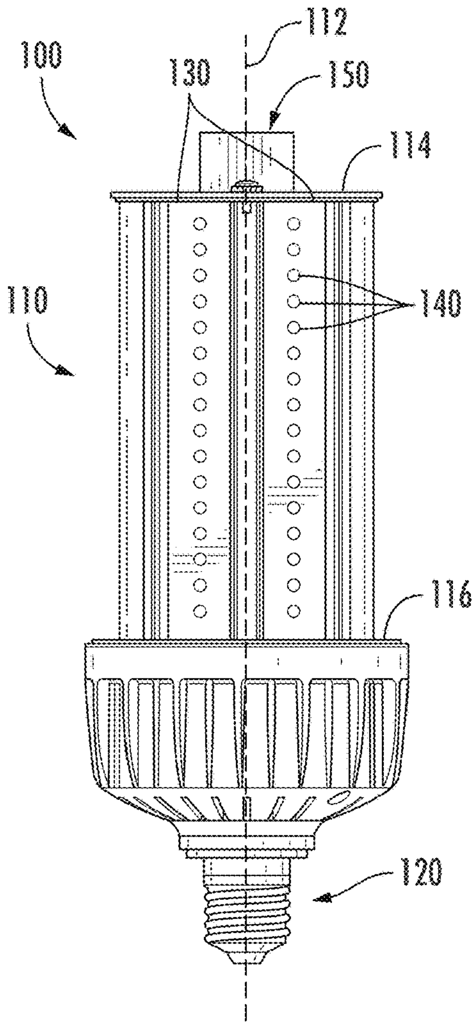
FIG. 2D is a rear view of the light of FIG. 1A.
Figure 2E:
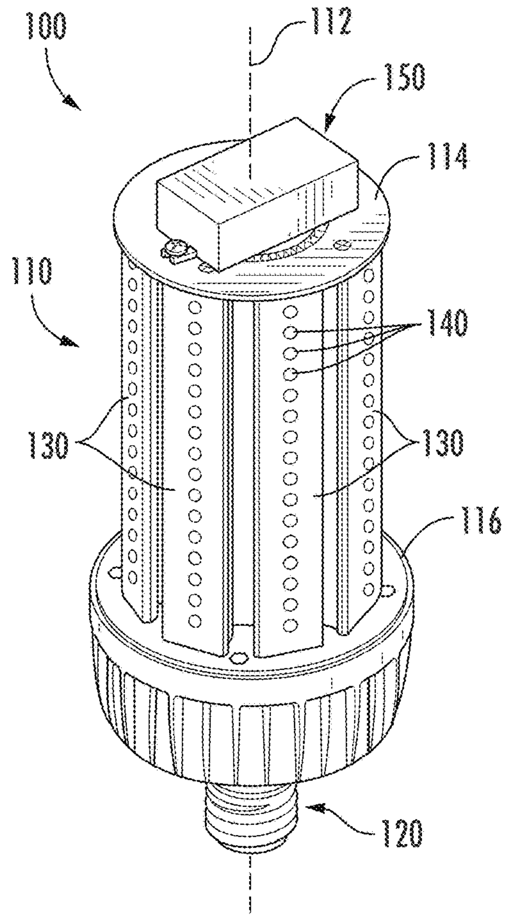
FIG. 2E is a perspective view of the light of FIG. 1A.
Figure 2F:
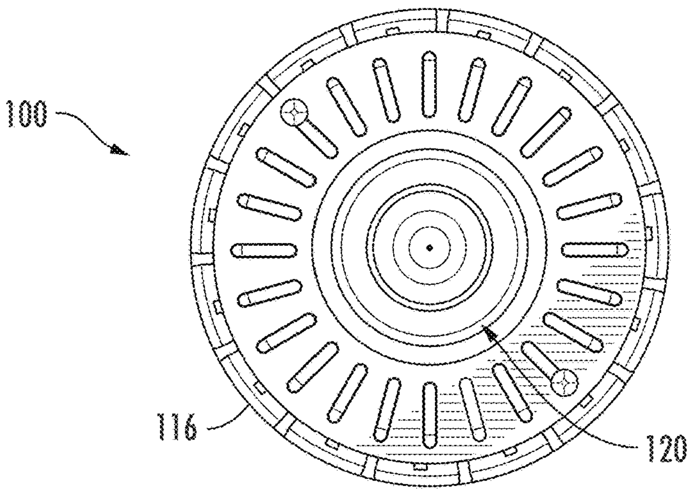
FIG. 2F is a bottom view of the light of FIG. 1A.

FIGS. 1A-2F show a light 100 according to one implementation. The light 100 includes a central body 110, eight lighting portions 130, and a long-range Bluetooth mesh module 150.

The central body 110 has a longitudinal axis 112, a first portion 114, and a second portion 116 opposite and spaced apart along the longitudinal axis 112 from the first portion 114. The light 100 shown in FIGS. 1A-2F has a diameter of 100 mm (3.94 inches) and an axial length of 250 mm (9.84 inches). In some implementations, the light is configured to have a minimum IP Rating of IP54 for a damp location (2024).

The central body 110 shown in FIGS. 1A-2F includes an E26/27 medium connector 120 for electrically coupling the light 100 to a lamp, but in some implementations, the light can include an E39/40 mogul connector or any other connector for electrically coupling the light to a lamp. In some implementations, the light does not include a standard electrical coupler. In some implementations, the light includes an integral driver configured for 100 VAC to 277 VAC. The light 100 shown in FIGS. 1A-2F is configured to be compatible with standard post top style luminaires.

Each of the eight lighting portions 130 shown in FIGS. 1A-2F includes sixteen red-green-blue-white (RGBW) surface-mounted device (SMD) light-emitting diodes 140 (LEDs) (625/520/465 Nm/4000K). However, in some implementations, each of the lighting portions includes red-green-blue-amber (RGBA) LEDs or red-green-blue (RGB) LEDs. In some implementations, the LEDs are wildlife-friendly and are configured to provide amber and/or red colors (580-620 nm). In some implementations, the LEDs are configured to produce 16.7 million or more colors. In some implementations, the LEDs are configured for flicker free light dimming between 1 percent to 100 percent.

In some implementations, the light is configured to comply with Part 15 of the Federal Communications Commission (FCC) rules (2024). In some implementations, the light is configured to comply with FCC radiation exposure limits (2024). In some implementations, the light is configured to be Electrical Testing Laboratories (ETL) listed (2024).

The sixteen LEDs 140 of each of the eight lighting portions 130 are linearly spaced apart from each other such that each of the eight lighting portions 130 extend from the first portion 114 to the second portion 116. The eight lighting portions 130 are circumferentially spaced apart from each other equally about the longitudinal axis 112 to form the "corn-style" lighting configuration.

Although the light 100 shown in FIGS. 1A-2F includes eight lighting portions 130, in some implementations, the light can include any number of two or more lighting portions. Furthermore, although each lighting portion 130 shown in FIGS. 1A-2F includes sixteen LEDs 140, in some implementations, each of the lighting portions can include any number of two or more LEDs.

The eight lighting portions 130 of the light 100 shown in FIGS. 1A-2F are configured to consume a total of 60 W, which makes the light 100 a replacement for many existing bulbs. The output of the lighting portions 130 of the light 100 show in FIGS. 1A-2F can have an average light level of 1.5 fc at 15 feet in white as measured in the horizontal plane. However, in some implementations, the light can be capable of having any average lighting level, such as in the range of 0.5 fc to 3.0 fc as measured in a horizontal plane at 10 feet or more. In some implementations, the light is configured to produce 4,400 lumens or more of light.

The long-range Bluetooth mesh module 150 (e.g., Casambi Gateway manufactured by CASAMBI TECHNOLOGIES OY, Espoo, Finland) is a Bluetooth Low Energy device that is capable of sending and receiving signals between neighboring lights 100 and from other electronic devices. The long-range Bluetooth mesh module 150 supports Bluetooth 5 technology. The signals sent can be encrypted signals to prevent third parties from interfering with or otherwise accessing the lighting system. The long-range Bluetooth mesh module 150 includes a controller 152 for controlling parameters of the two or more LEDs 140, a Bluetooth receiver 154, and a Bluetooth amplifier 156.

The Bluetooth receiver 154 and Bluetooth amplifier 156 are able to cause the long-range Bluetooth mesh module 150 to send and receive long-range Bluetooth signals a working distance of 200 m or more along an unobstructed line of sight. However, in some implementations, the Bluetooth receiver and Bluetooth amplifier are able to send and receive long-range Bluetooth signals a working distance of 100 m or more along an unobstructed line of sight. In some implementations, the Bluetooth receiver and Bluetooth amplifier are able to send and receive long-range Bluetooth signals a working distance of 30 m or more along an unobstructed line of sight.

The Bluetooth signals being sent and received by the Bluetooth receiver 154 can include information for up to two hundred and fifty lights 100. In use, the two or more lights 100 in a system send and receive Bluetooth signals between the long-range Bluetooth mesh modules 150 of the lights 100 to communicate information.

If the lights 100 are located in a row, then each sequential light 100 is capable of relaying its information and the information of up to two hundred and fifty other lights 100 to the next light 100 in the row. If the lights 100 are spaced apart from each other such that each light 100 is within the working signal distance of the next two or more lights 100 in the row, then the signal being sent from a light 100 can skip the next sequential light 100 if needed. This is helpful in situations where a light 100 may be malfunctioning or have failed. In this case, the malfunctioning or failed light 100 can be skipped such that the flow of information is not impeded along the row of lights 100. The light system can also be used with one or more signal amplifiers and/or gateways to help provide signals for controlling the lights 100 throughout a system. In some implementations, the light is compatible with Wi-fi and/or Cellular Gateways.

In situations where there are two or more lights 100 located in a non-linear cluster throughout an area, such as along various pathways throughout a park, the lights 100 may be within signal range of multiple lights 100 within the working signal distance. In such cases, each light 100 may be capable of sending signals to lights 100 in two or more directions, creating a web of lighting signals throughout the area occupied by the lights 100 and substantially reducing the chances that malfunctioning or failed lights 100 could fully disrupt the flow of information to each of the functioning lights 100 in the area.

An initial signal can be propagated by an electronic device such as a computer or mobile device. The initial signal can include information for the parameters (e.g., on/off, brightness, color, warmth, etc.) of each individual light 100 within a system of lights 100 that the signal is intended to control.

The initial signal can then be received by the long-range Bluetooth mesh module 150 of a first light 100. The first light 100 can then change its parameters based on the information for the first light 100 that was included in the signal. The long-range Bluetooth mesh module 150 of the first light 100 can then send a signal including the information for the parameters of all or the remainder of the lights 100.

The long-range Bluetooth mesh modules 150 of the second light 100 or more lights 100 can receive the signal from the first light 100. The second light 100 and/or other lights 100 can then change their parameters based on the information for the respective light 100 that was included in the signal. Each light 100 that received the signal can then retransmit the signal after receiving the signal such that a chain of signals is sent throughout the light system. Each light 100 that receives the signal can change its parameters based on the information for the respective light 100 that was included in the signal. Thus, the original signal is received by each light 100 in the system, and each light 100 can change its parameters based on the information in the signal.

The signal can include information for the parameters of a single light 100 within a system, multiple lights 100 within a system, or all of the lights 100 within a system. The system can also include a schedule (e.g., specific time, sunset, or sunrise) for the lights 100 in a system that triggers predetermined signals to be sent at a predetermined time. The signals can also be programmed to change the parameters of the lights 100 in a system in a sequence such that the lights 100 within the system create a light show, scene, animation, or other aesthetic display. The light 100 can utilize an astrological clock/calendar/timer to trigger such visual displays or other predetermined parameters. In some implementations, the lights include motion/occupancy sensors to change the parameters of one or more lights in a system.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A light comprising:

a central body having a longitudinal axis, a first portion, and a second portion opposite and spaced apart along the longitudinal axis from the first portion; and two or more lighting portions each including two or more red-green-blue (RGB) light-emitting diodes (LEDs), wherein the two or more LEDs of each of the two or more lighting portions are linearly spaced apart from each other such that each of the two or more lighting portions extend from the first portion to the second portion, wherein the two or more lighting portions are circumferentially spaced apart from each other about the longitudinal axis;

a long-range Bluetooth mesh module having:

a controller for controlling parameters of the two or more LEDs;

a Bluetooth receiver; and a Bluetooth amplifier, wherein the long-range Bluetooth mesh module is capable of sending a signal including information for the parameters of the light and one or more other lights, and wherein the long-range Bluetooth mesh module is capable of receiving the signal from the one or more lights and adjusting the parameters of the light based on the information included in the signal.

2. The light of claim 1, further comprising an E26/27 medium connector or an E39/40 mogul connector.

3. The light of claim 1, wherein the two or more lighting portions are a total of 60 W.

4. The light of claim 1, wherein the two or more RGB LEDs comprise two or more red-green-blue-white (RGBW) LEDs.

5. The light of claim 1, wherein the two or more RGB LEDs comprise two or more red-green-blue-amber (RGBA) LEDs.

6. The light of claim 1, wherein the two or more lighting portions are capable of having an average light level in the range of 0.5 fc to 3.0 fc as measured in a horizontal plane.

7. The light of claim 6, wherein the average light level is 1.5 fc as measured in the horizontal plane.

8. The light of claim 1, wherein the two or more lighting portions includes eight or more lighting portions.

9. The light of claim 1, wherein the two or more LEDs includes sixteen or more LEDs.

10. The light of claim 1, wherein the two or more lighting portions are circumferentially spaced apart from each other equally about the longitudinal axis.

11. The light of claim 1, wherein the Bluetooth amplifier is capable of transmitting a readable Bluetooth signal 30 m or more along an unobstructed line of sight.

12. The light of claim 1, wherein the Bluetooth receiver is capable of receiving and sending Bluetooth signals including information for up to two hundred and fifty lights.

13. The light of claim 1, wherein the long-range Bluetooth mesh module is a Bluetooth Low Energy device.

14. A lighting system comprising:

a first light and a second light each comprising:

a central body having a longitudinal axis, a first portion, and a second portion opposite and spaced apart along the longitudinal axis from the first portion;

two or more lighting portions each including two or more LEDs, wherein the two or more LEDs of each of the two or more lighting portions are linearly spaced apart from each other such that each of the two or more lighting portions extend from the first portion to the second portion, wherein the two or more lighting portions are circumferentially spaced apart from each other about the longitudinal axis; and a long-range Bluetooth mesh module having:

a controller for controlling parameters of the two or more LEDs;

a Bluetooth receiver; and a Bluetooth amplifier, wherein the long-range Bluetooth mesh module of the first light is capable of sending to the second light a signal including information for the parameters of the first light and the second light, and wherein the long-range Bluetooth mesh module of the second light is capable of receiving the signal and adjusting the parameters of the second light based on the information included in the signal.

15. The lighting system of claim 14, wherein the first light and the second light each further comprise an E26/27 medium connector or an E39/40 mogul connector.

16. The lighting system of claim 14, wherein the two or more lighting portions of each of the first light and the second light are a total of 60 W.

17. The lighting system of claim 14, wherein the two or more RGB LEDs of each of the first light and the second light comprise two or more red-green-blue-white (RGBW) LEDs.

18. The light system of claim 14, wherein the two or more RGB LEDs of each of the first light and the second light comprise two or more red-green-blue-amber (RGBA) LEDs.

19. The light system of claim 14, wherein the two or more lighting portions are capable of having an average light level in the range of 0.5 fc to 3.0 fc as measured in a horizontal plane.

20. The light system of claim 19, wherein the average light level is 1.5 fc as measured in the horizontal plane.

21. The lighting system of claim 14, wherein the two or more lighting portions of each of the first light and the second light includes eight or more lighting portions.

22. The lighting system of claim 14, wherein the two or more LEDs of each of the first light and the second light includes sixteen or more LEDs.

23. The lighting system of claim 14, wherein the two or more lighting portions of each of the first light and the second light are circumferentially spaced apart from each other equally about the longitudinal axis.

24. The lighting system of claim 14, wherein the Bluetooth amplifier of each of the first light and the second light is capable of transmitting a readable Bluetooth signal 30 m or more along an unobstructed line of sight.

25. The lighting system of claim 14, wherein the Bluetooth receiver of each of the first light and the second light is capable of receiving and sending Bluetooth signals including information for up to two hundred and fifty lights.

26. The lighting system of claim 14, wherein the long-range Bluetooth mesh module of the first light and the second light is a Bluetooth Low Energy device.

* * * * *